Figure 1:
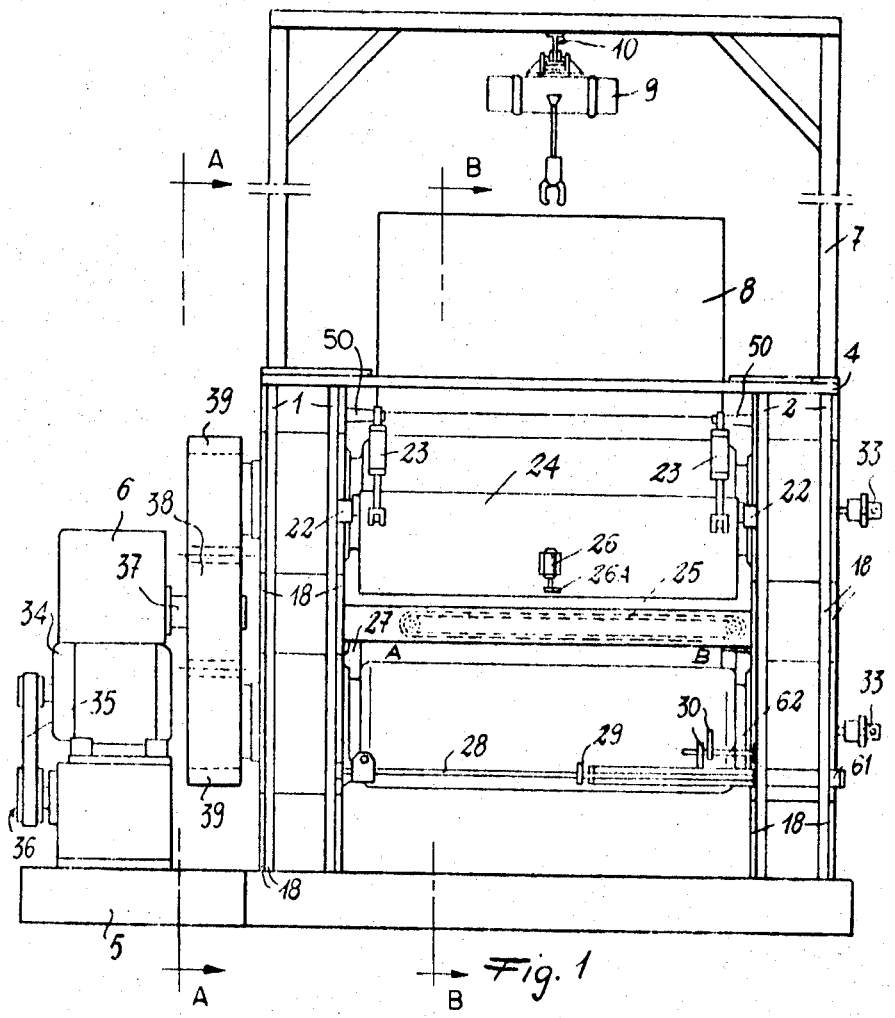

United States Patent [19]
Mambretti

[11] 3,761,217
[45] Sept. 25, 1973

[54] MACHINE FOR PROCESSING PLASTIC MATERIALS

[76] Inventor: Giancarlo Mambretti, Carnago, Italy 21040

[22] Filed: Jan. 28, 1972

[21] Appl. No.: 221,593

[30] Foreign Application Priority Data
Feb. 1, 1971 Italy .............................. 20010 A/71
Feb. 10, 1971 Italy .............................. 20388 A/71

[52] U.S. Cl. ................................ 425/224, 425/363
[51] Int. Cl. .............................................. B29d 7/14
[58] Field of Search ............................ 425/224, 363

[56] References Cited
UNITED STATES PATENTS
| | | | |
|---|---|---|---|
| 1,882,160 | 10/1932 | Paris | 425/363 X |
| 2,958,094 | 11/1960 | Curletti | 425/363 X |
| 1,469,658 | 10/1923 | McCrohan | 425/367 X |
| 2,788,752 | 4/1957 | Rhodes | 425/363 X |
| 1,503,665 | 8/1924 | Roberts | 156/231 |
| 3,674,389 | 7/1972 | Sturgeon et al. | 425/224 X |

Primary Examiner—Robert L. Spicer, Jr.
Attorney—Richard P. Alberi

[57] ABSTRACT

A machine for processing plastic materials, particularly polyvinyl chloride comprising a first pair of rotating rolls, means cooperating with one of said rolls to separate the plastic material film adhering thereto, a conveyor belt receiving at least part of the plastic material, and a second pair of rolls receiving at an end zone thereof the material carried by the conveyor belt.

7 Claims, 5 Drawing Figures

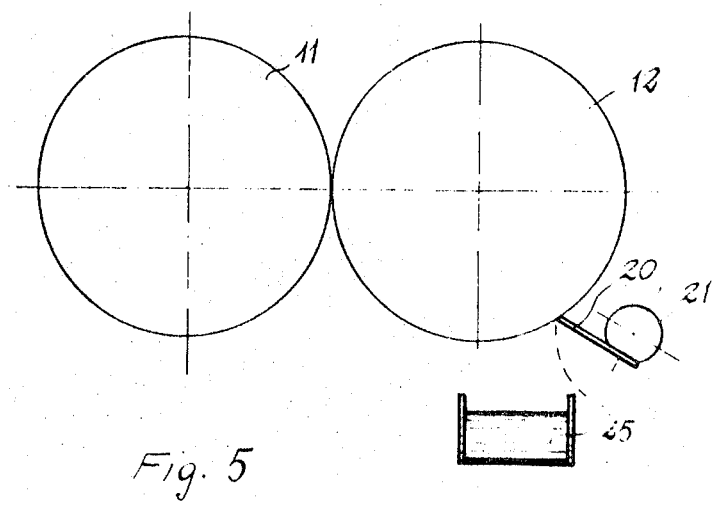
Fig. 5
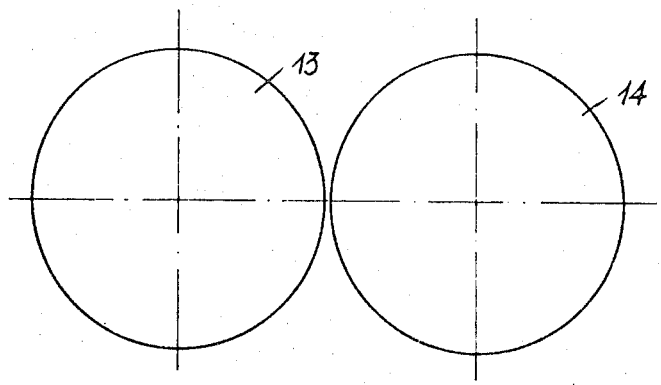

MACHINE FOR PROCESSING PLASTIC MATERIALS

This invention relates to a machine for processing such thermoplastic materials as polyvinyl chloride (hereinafter referred to as PVC), and in the case other materials.

Particularly referring to PVC processing, it is well known that the starting raw material may assume several forms, such as (1) dry mixture of PVC powder with plasticizers, stabilizers, fillers, dyes and the like; (2) punching off-cuts and scraps as provided when manufacturing different PVC sheet products; (3) thermoplastic material plates or blocks as provided by heat mixing off-cuts and scraps; and (achines) granules as provided for example by plastic material drawing and granulating.

It is known that PVC can be converted to a continuous sheet by such operating machines as calenders and drawing machines. For a correct operation, these machines, and particularly the calenders, should be uniformy supplied with a PVC strip or card at a plastic condition. In the present art, the common practice to supply calenders or drawing is to use a combination of a plurality of series operating machines, such machines being referred to as: two-cylinder mixers, Banbury type of mixers, continuous mixers, single-or multi-screw drawing machines, etc.

The main object of the present invention is to provide a compact versatile machine for forming a continuous hot strip directly utilizable by drawing machines or calenders from heterogeneous forms of thermoplastic material, and particularly PVC.

A machine according to the invention is characterized by comprising two pairs of rolls arranged above each other, wherein one roll of at least one pair of rolls rotates at a different speed than the other roll of the same pair of rolls, and in that means cooperates with one roll of the top pair of rolls to separate the plastic material film being formed, film which is then brought to a conveyor means which carries the separated material to and end of the bottom pair, where the material is processed to a layer adhering to one of said rolls and tending to the other end, at which the material strip is removed by per se known cutting means.

The following are the major advantages of the compact versatile machine according to the invention over any other known combination of machines:

1. lower cost of the machine with respect to a combination of machines;
2. reduction in labour (one or more operators);
3. reduction in operating room (more than 100 percent); and
4. saving in electric power (in some cases more than 100 percent).

Figure 2:
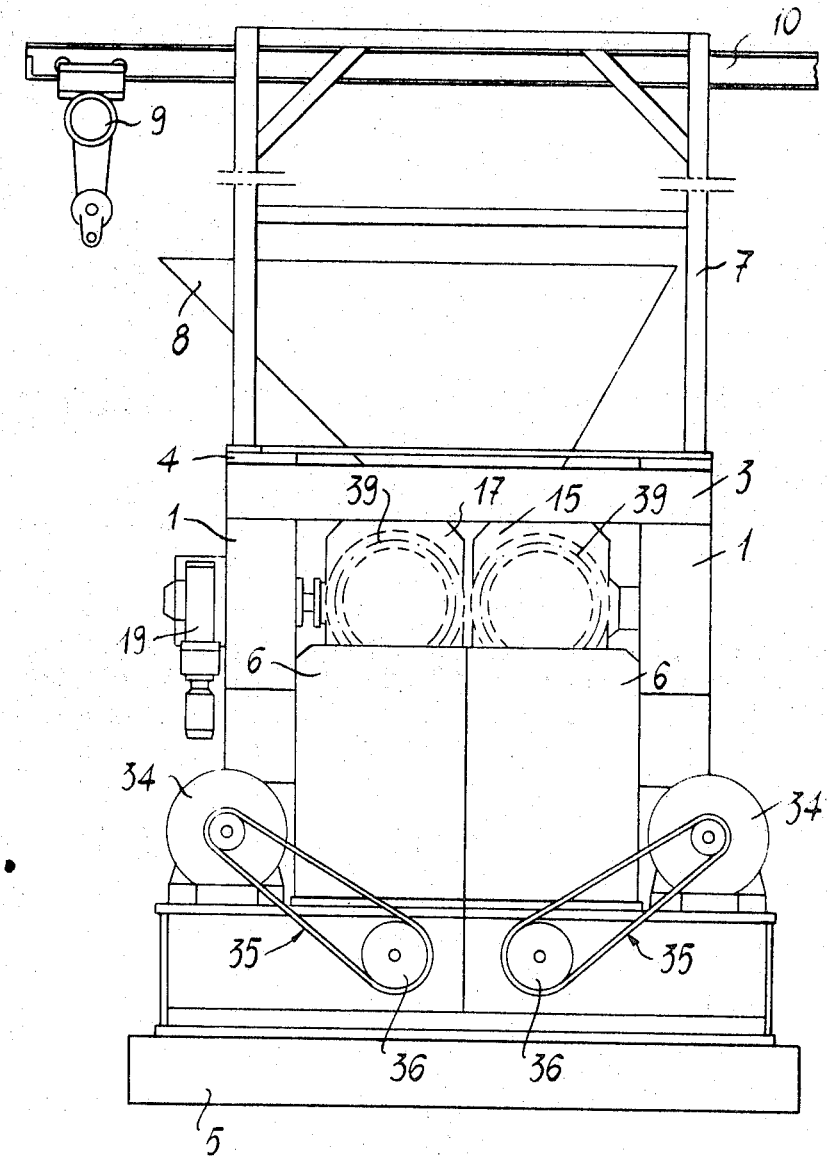
Figure 3:
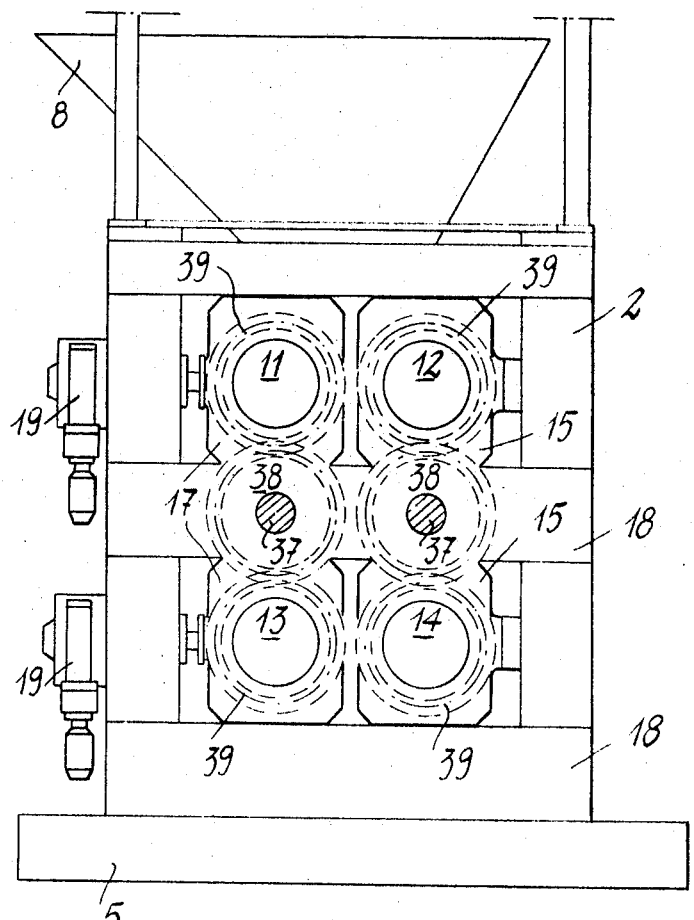
Figure 4:
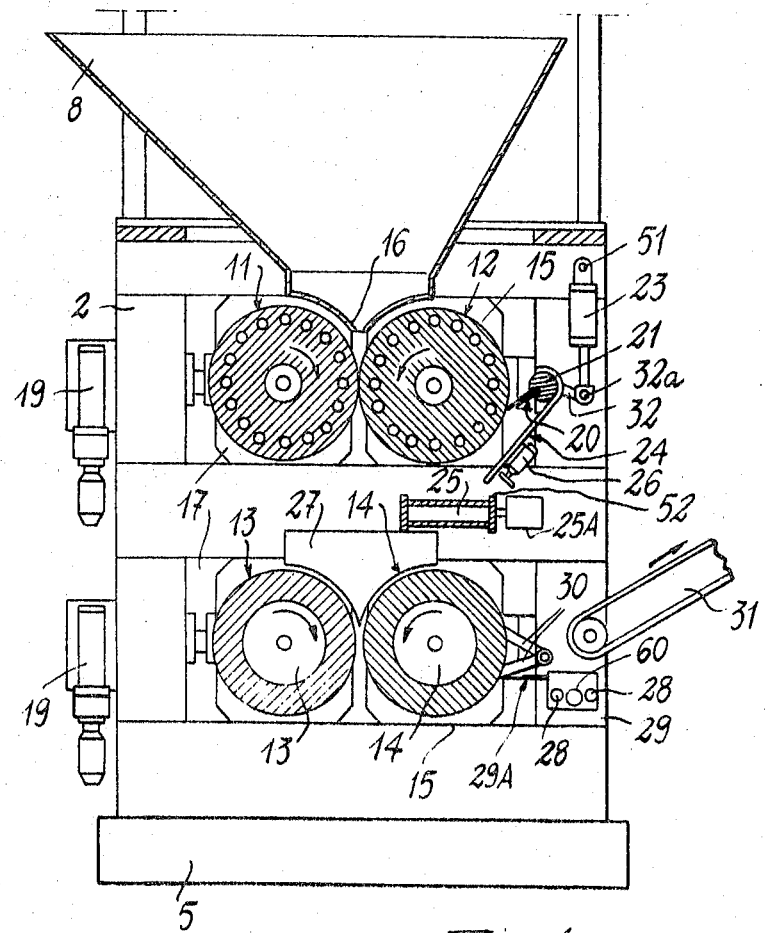

The invention will be better understood from the following detailed description of a preferred embodiment thereof, as given by mere way of not limiting example and shown in the appended drawings in which:

FIG. 1 is a front view of the machine;
FIG. 2 is a side view thereof;
FIG. 3 is a sectional view taken along line A—A;
FIG. 4 is a sectional view taken along line B—B; and
FIG. 5 is a schematic side view of a modified embodiment.

Referring to FIGS. 1–4, the inventive machine is formed of a frame comprising plates and sections which are welded and bolted to one another by conventional techniques, so as to form two sides 1 and 2 interconnected by crosspieces 3 and 4, and a base 5 carrying a speed reducer 6 and which secures the whole assembly to ground by joining the two sides at the bottom. Obviously, the frame and base can be made of casting, cast iron or steel.

The upper crosspiece 4 carry a trestle 7, at the mid portion of which a loading hopper 8 is provided, this hopper being carried by the frame and capable of being filled by means of a winch running on a section 10 carried by said trestle 7.

As more fully explained below, said frame carries two pairs of heated rolls 11, 12 and 13, 14 rotating in the direction as shown by the arrows and symmetrically placed above each other.

Rolls 12 and 14 are fixedly secured by their associated supports 15 to sides 1 and 2, whereas rolls 11 and 13 are movable, or can run through their associated supports 17 on quideways comprising beams 18 forming part of the structure for each side 1, 2.

Movable rolls 11, 13 can be driven by devices well known in the plastic material calender field, for example comprising four speed reducers 19 kinematically connected to the roll supports 17.

As to the top pair of rolls 11 and 12, these rolls operate as highly pressed against each other, roll 12 rotating at a higher speed than roll 11, thus exerting a friction on the thermoplastic material being fed by gravity between the rolls from said hopper 8 through its associated outlet 16.

This material will adhere to the fastest roll 12, forming a thin sheet or foil which is then removed from the roll surface by a separating means comprising a scraping blade 20.

This blade 20 is mounted (for example fixed) on a shaft 21 rotable on two bearings 22 attached to the sides 1 and 2. Two hydraulic or pneumatic jacks 23 act upon this shaft through arms 32 and hinges 32A, said jacks being in turn secured by means of brackets 50 and hinges 51 to the sides 1 and 2. These jacks serve both the purpose of causing said scraping blade 20 to firmly adhere to the surface of roll 12, and to separate it therefrom.

An inclined sheet 24 is also attached on said shaft 21 and, as shown in an operative step in FIG. 4, is for causing the scraped plastic material to fall down on an underlying conveyor belt 25.

In order to prevent hot plastic material from tacking on said sheet 24 and to facilitate its slipping thereon, it has been contemplated both to provide the sheet with a suitable vibrating system (such as an electric motor 26, on the axis of which an eccentric mass 26A is mounted), and to treat the surface contacting the hot material with antiadhesive products, such as Teflon.

The scraped plastic material moves down from the vibrating sheet 24 on the conveyor belt 25 which is directly attached to the sides 1 and 2 through two plates 52 acting as side walls. The conveyor belt 25 is driven by a speed reducer 25A coupled to the axis for one of the conveyor belt rolls and carried by side 2. This conveyor belt is confined between the two side plates 52 preventing the transported material from sidewise falling down. The length of the conveyor belt should be less than that of the underlying roll 14, in order to readily unload the material at the zone A in FIG. 1, that is at or adjacent an end of said roll. As it will be seen, the conveyor belt 25 is located above the roll 14.

In contrast with the top pair of rolls, the rolls 13 and 14 do not operate as pressed against each other and can rotate at a same or different speed, according to processing requirements.

On falling down from the conveyor belt 25 on the underlying rolls, the material will wrap only one of such rolls (roll 14 in the example shown), forming a rotating covering or coating; two borders 27, acting just as containers, are firmly attached to the sides 1 and 2 in order to prevent said covering from being transferred at the roll sides.

To promote the natural movement of the plastic material from zone A to the opposite zone B along roll 14 (FIG. 1) and also to facilitate the mixing and homogenization thereof, a pair of parallel rods 28 (FIG. 4) are secured between the machine sides 1 and 2, a slide 29 carrying a blade 29A being slidably mounted thereon. This slide is connected with the free end of the stem 60 of a double acting cylinder attached to side 2. The blade runs parallel to the axis of roll 14 and cuts the plastic coating on the roll; the movement of this blade from zone A to about the middle of the roll table is intermittently reciprocating and timed at will in accordance with the operating requirements.

The thermoplastic material, which also because of the rotating movement of roll 14 will slowly move to the table location B (FIG. 1), here encounters a pair of per se known parallel knives 30, which are secured at an adjustable spacing on a shaft 62 attached to side 2 and cut a hot continuous strip of plastic material. This strip (FIG. 4) is then withdrawn by a conveyor belt 31 and carried, for example, to supply a calender.

The four rolls can be heated by means of any — system in the field of calenders for rubber and plastic materials. For example, as shown in FIG. 1, by means of four connectors 33, protruding from one side of each roll, the heating fluid is admitted and withdrawn when cooled down. The rolls may be made so as to have a large central chamber (for example, as rolls 13 and 14 — FIG. 4), or have a serial of peripheral holes (for example, as rolls 11 and 12 — FIG. 4) intercommunicating and having a small central chamber, the hot fluid operating therein.

The roll heating system has been briefly described not only in that such a solution is well known, but also because beating could be provided in many other ways (by electric resistances or by induction systems, etc.).

Also as to the actuation of the rolls, different systems and criteria can be used. In the example as shown in FIGS. 1, 2 and 3, two separate drawing units are provided, each of which comprising an electric motor 34 either of a constant or variable speed, and through V-belts 35 driving a pulley 36 which is keyed on the inlet axis of a reducer 6, therefrom emerging an outlet pin 37 on which a gear 38 is keyed. In turn, each gear 38 rotably drives two gears 39 keyed on the pins for one of the top rolls and one of the bottom rolls.

It is as well within the scope of the invention to provide for operating the machine also from a single motor, or a plurality of electric motors either at a fixed or variable speed, or from a single or a plurality of hydraulic motors both through V-belts and axial keyings to the reducer.

Referring to FIG. 4, gears 38 on the right will drive rolls 12 and 14, whereas gear 38 on the left drives rolls 11 and 13. Substantially, each driving unit will drive the two overlying rolls of the two pairs of rolls.

Rather than by gearings, as above shown, it is also within the scope of the invention to drive said rolls 11, 12 13 and 14 by a reducer having four outlet pins, universal joints or the like being keyed thereon and rotably driving the machine rolls.

In FIG. 5, showing a modified embodiment of the invention, the same reference numerals are used for designating like or equivalent parts. Moreover, the construction of the machine as shown in this FIG. 5 is identical to that above described, except for the differences which will be pointed out in the following description. When considering this, a detailed description of the common parts is deemed not necessary.

Referring to FIG. 5, reference numerals 11 and 12 designate the rolls of the top pair, wherein roll 12 rotates at a higher speed. A relatively thin film of plastic material as processed by such a pair of rolls adheres on said roll 12. The plastic material film adhering to roll 12 is separated therefrom by a separating means, comprising a scraping blade 20 carried on a rotable shaft 22, as above described. This scraping blade 20 is arranged so that the separated plastic material directly falls down on an underlying conveyor belt 25 at the zone designated by A in FIG. 1, that is at the zone where said conveyor belt does not extend, directly on the roll 14 of the bottom pair of rolls to which roll 13 pertains.

As above stated, the separated material partly falls directly down on roll 14 and partly on conveyor belt 25, which carries said material to the end zone A of said roll, where it is processed by the bottom pair of rolls 13, 14 and builds up on roll 14 a coating which gradually expands to the other end of said roll, being removed therefrom by the above described operations.

What is claimed is:

1. A machine for processing plastic materials, particularly polyvinyl chloride, comprising:
   a top pair of rotating rolls;
   means cooperating with one of said top pair of rolls to separate the plastic material film adhering thereto;
   a bottom pair of rolls positioned below said top pair of rolls;
   a conveyor belt arranged substantially above one roll of said bottom pair of rolls and receiving at least part of the plastic material, said bottom pair of rolls receiving at an end zone thereof the material carried by said conveyor belt.

2. A machine as claimed in claim 1, wherein one roll of at least one pair of said top rolls rotates at a faster speed than the other roll of the same pair of rolls, and including a vibrating sheet for at least partly unloading the separated material onto said conveyor carrying the separated material to an end zone of the bottom pair of rolls, by which pair of rolls the material is processed to a layer adhering to one of the rolls and tending to the other end, where it is withdrawn as a strip.

3. A machine as claimed in claim 1, wherein the plastic material adhering to the roll of the bottom pair of rolls is cut in the direction of the roll axis by an intermittently oscillating blade.

4. A machine as claimed in claim 1, wherein the vibrating plane is coated with a material for promoting a sliding of the material separated from the top fast roll.

5. A machine as claimed in claim 1, including two speed reducing units, each of which drives two rolls of a different pair of rolls.

6. A machine as claimed in claim 1, wherein said separating means are arranged along the periphery of the fastest roll of the top pair of rolls, so that the material being separated from said roll is at least partly brought on the underlying conveyor belt.

7. A machine as claimed in claim 6, wherein the position of said separating means is selected so that a portion of the separated material falls directly down on one roll of the bottom pair of rolls at the zone not involved by the conveyor belt.

* * * * *